(12) United States Patent
Chae et al.

(10) Patent No.: US 12,391,048 B2
(45) Date of Patent: Aug. 19, 2025

(54) AUTHENTICATION OF CONSUMABLE BY OPENING AND CLOSING OF PARTS

(71) Applicant: Hewlett-Packard Development Company, L.P., Spring, TX (US)

(72) Inventors: Seokheon Chae, Seongnam-si (KR); Hyojoon Bae, Seongnam-si (KR); Byungkyu Kim, Seongnam-si (KR)

(73) Assignee: Hewlett-Packard Development Company, L.P., Spring, TX (US)

( * ) Notice: Subject to any disclaimer, the term of this patent is extended or adjusted under 35 U.S.C. 154(b) by 269 days.

(21) Appl. No.: 18/034,135

(22) PCT Filed: May 25, 2021

(86) PCT No.: PCT/US2021/034007
§ 371 (c)(1),
(2) Date: Apr. 27, 2023

(87) PCT Pub. No.: WO2022/093321
PCT Pub. Date: May 5, 2022

(65) Prior Publication Data
US 2023/0391097 A1    Dec. 7, 2023

(30) Foreign Application Priority Data
Oct. 28, 2020 (KR) .......... 10-2020-0141557

(51) Int. Cl.
B41J 2/175    (2006.01)
B41J 29/13    (2006.01)
B41J 29/54    (2006.01)

(52) U.S. Cl.
CPC .......... *B41J 2/17546* (2013.01); *B41J 29/13* (2013.01); *B41J 29/54* (2013.01)

(58) Field of Classification Search
CPC ...... B41J 2/1752; B41J 2/17546; B41J 29/13; B41J 29/54; G03G 15/0863;
(Continued)

(56) References Cited

U.S. PATENT DOCUMENTS 9,400,468 B2 * 7/2016 Wood ................. G03G 15/0863
2006/0216046 A1 * 9/2006 Hatakeyama ...... G03G 15/0863
399/27

(Continued)

FOREIGN PATENT DOCUMENTS

JP    2005-251156 A    9/2005
JP    2008-152419 A    7/2008
(Continued)

*Primary Examiner* — Anh T Vo
(74) *Attorney, Agent, or Firm* — Brooks, Cameron & Huebsch, PLLC

(57) ABSTRACT

An example image forming apparatus includes a sensor to sense an opening or a closing of a component to access a consumable in the image forming apparatus, a processor, and a memory to store instructions that may be executed by the processor. By executing the instructions, the processor is to confirm an opening/closing history of the component based on a signal sensed by the sensor, as a preset event occurs in the image forming apparatus, and skip performance of an authentication operation on the consumable in a case where the opening/closing history of the component is not detected.

19 Claims, 12 Drawing Sheets

(58) Field of Classification Search
CPC ............... G03G 15/5091; G03G 15/55; G03G 21/1633; G03G 21/1892; G03G 2215/0695; G06F 21/44; Y02D 10/00
See application file for complete search history.

(56) References Cited

U.S. PATENT DOCUMENTS

| | | |
|---|---|---|
| 2007/0092280 A1 | 4/2007 | Nakazato et al. |
| 2010/0183320 A1 | 7/2010 | Yamada |
| 2012/0062950 A1 | 3/2012 | Lee |
| 2013/0027737 A1 | 1/2013 | Suzuki |
| 2015/0104200 A1 | 4/2015 | Matsumoto |
| 2017/0075277 A1 | 3/2017 | Kanakubo |
| 2017/0230540 A1 | 8/2017 | Sasaki |
| 2019/0193410 A1* | 6/2019 | Minamikawa ....... B41J 2/17513 |

FOREIGN PATENT DOCUMENTS

| | | |
|---|---|---|
| JP | 2014-225186 A | 12/2014 |
| JP | 2015-099196 A | 5/2015 |

* cited by examiner

FIG. 5

AUTHENTICATION OF CONSUMABLE BY OPENING AND CLOSING OF PARTS

BACKGROUND

To replace a consumable in an image forming apparatus, a user may open a door of the image forming apparatus, replace the consumable, and close the door. Based on replacing the consumable, the image forming apparatus may perform an authentication operation on the consumable.

The image forming apparatus may also perform an authentication operation on a consumable in a case where the image forming apparatus is released from a sleep mode in addition to a case where the door of the image forming apparatus is opened and closed.

BRIEF DESCRIPTION OF THE DRAWINGS

FIG. 5 is a diagram for describing a screen displayed in a user interface unit of an image forming apparatus according to an example.

DETAILED DESCRIPTION OF EXAMPLES

Figure 1:
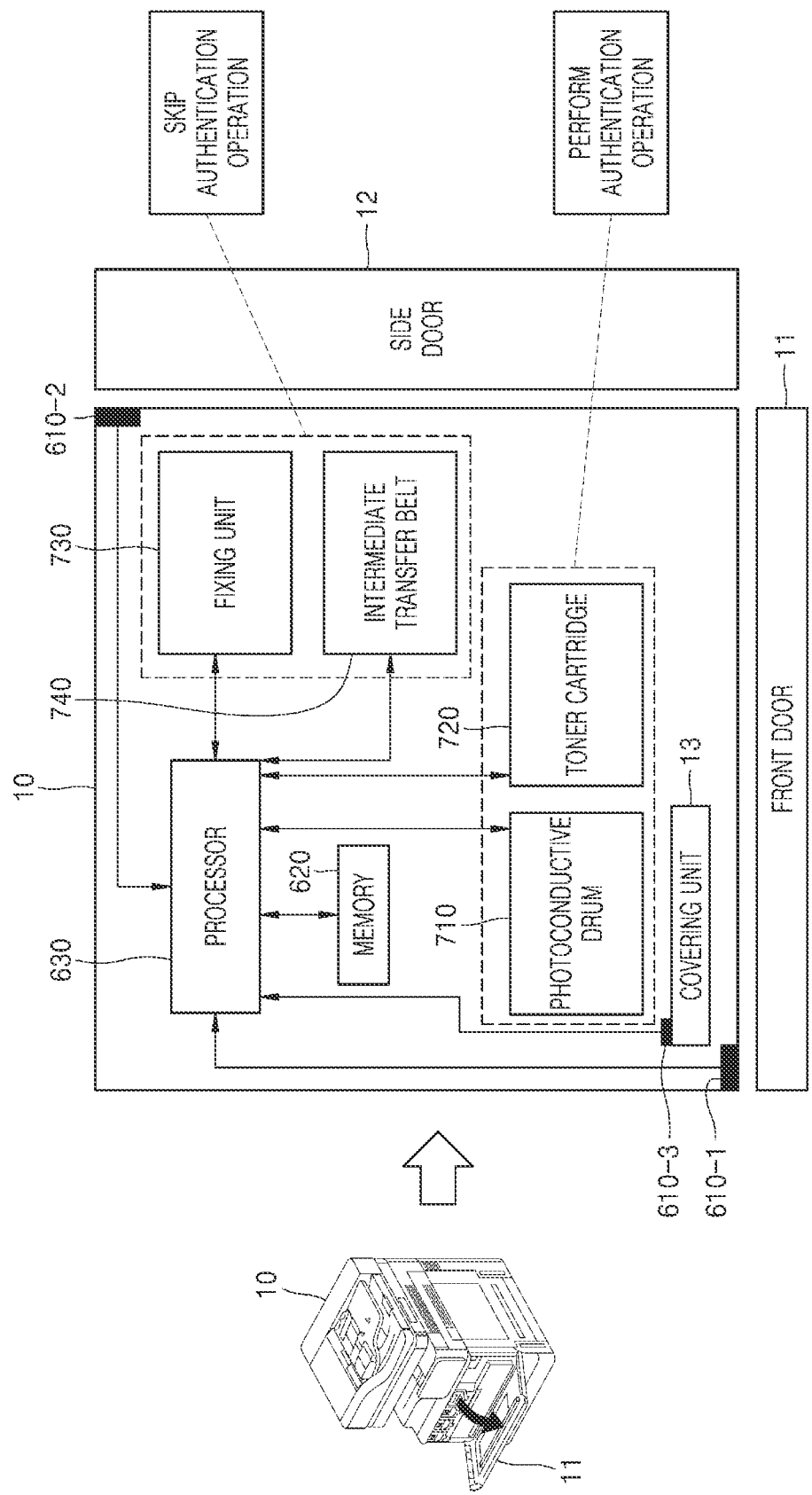
FIG. 1 is a conceptual diagram for describing an authentication operation on a consumable according to detection of an opening/closing history of a component to access the consumable in an image forming apparatus according to an example.

Hereinafter, examples will be described with reference to the accompanying drawings. However, the present disclosure may be implemented in many different forms and is not limited to the examples described herein.

The term "image forming apparatus" may refer to any type of apparatus capable of performing an image forming job, for example, a printer, a copier, a scanner, a fax machine, a multi-function printer (MFP), a display device, and the like. In addition, the image forming apparatus may be a two-dimensional image forming apparatus or a three-dimensional image forming apparatus. An "image forming job performed by the image forming apparatus" may refer to a job related to printing, copying, faxing, storing, transferring, coating, and the like, or may be a job in which at least two of the jobs are combined.

The term "consumable" may refer to a component mounted in an image forming apparatus that may be worn out or depleted to become unusable as the image forming apparatus performs an operation. For example, the consumable may include a toner cartridge, a photoconductive drum, a roller, a fuser, an intermediate transfer medium, and the like.

A "sensor" may sense an opening or a closing of a part to approach (e.g., access) a consumable in the image forming apparatus. For example, a "part" to approach a consumable may be a door attached to the image forming apparatus, a cover unit to cover the consumable, a locking unit of the consumable, and the like. For example, the sensor may be attached to a consumable for each corresponding part. For example, the sensor may include a sensor to sense an opening/closing operation of a front door of the image forming apparatus, a sensor to sense an opening/closing operation of a side door of the image forming apparatus, a sensor to sense separation or an opening/closing operation of a covering unit that covers a front surface of a consumable, and the like.

An "opening/closing operation" of a part may refer to an opening operation or a closing operation of the part. In addition, the "opening/closing operation" of the part may refer to an unlocking operation or a locking operation of the part. An "opening/closing history" of the part may refer to a process of the opening/closing operation of the part. In addition, the "opening/closing history" of the part may refer to the history of the opening/closing operation of the part. Confirming the opening/closing history of the part may refer to confirming whether there was the opening/closing history of the part or detecting the opening/closing operation of the part.

An "authentication operation" of a consumable may refer to a security process to confirm information regarding the consumable mounted in the image forming apparatus. For example, the authentication operation on the consumable may be performed by comparing authentication information stored in a memory of the consumable with authentication information of the consumable stored in a memory of the image forming apparatus. For example, the authentication information may include product number information indicating intrinsic information of the consumable, information regarding whether the consumable is genuine, and the like.

FIG. 1 is a conceptual diagram for describing an authentication operation on a consumable according to detection of an opening/closing history of a component to access the consumable in an image forming apparatus according to an example.

Referring to FIG. 1, a user may open a front door 11 of an image forming apparatus 10 to replace a consumable mounted near the front door 11 or perform a status check. In a case where the front door 11 is closed after the consumable is replaced or the status check is complete, after an authentication operation on the consumable, the image forming apparatus 10 may perform a preparation operation for the image forming job or perform the image forming job. However, in a case where the authentication operation is performed on the consumable based on the opening/closing operation merely being a simple opening/closing operation and not being an opening/closing operation of the front door due to the replacement or status check of the consumable, a process rate of the image forming job may be delayed.

Therefore, the image forming apparatus may select a case in which the consumable is detached from the image forming apparatus 10 or mounted in the image forming apparatus 10 and perform the authentication operation on the consumable.

For example, to select a case in which the consumable is removed from the image forming apparatus or the consumable is mounted in the image forming apparatus, the image forming apparatus 10 may sense an opening/closing of a component to approach the consumable, based on a sensor that is mounted in the image forming apparatus 10.

As shown in FIG. 1, a photoconductive drum 710 and a toner cartridge 720 may be mounted near the front door 11 of the image forming apparatus. For example, a covering unit 13 may be mounted near a front surface of the photoconductive drum 710. The covering unit 13 may cover a front surface of the photoconductive drum 710. For example, the covering unit 13 may be a waste toner container, a duct, and the like. In addition, a fixing unit 730 and an intermediate transfer belt 740 may be mounted near a side door 12 of the image forming apparatus 10.

For example, an opening operation of the front door 11 may be performed to replace the toner cartridge 720. Based on replacing of the toner cartridge 720, a closing operation of the front door 11 may be performed. In the image forming apparatus 10, a first sensor 610-1 to sense the opening/closing operation of the front door 11 may be mounted near the front door 11. The first sensor 610-1 may obtain a signal corresponding to the opening/closing operation of the front door and deliver the signal to a processor 630.

For example, an opening operation of the side door 12 may be performed for a status check of the fixing unit 730. After the status check of the fixing unit 730 is complete, a closing operation of the side door 12 may be performed. In the image forming apparatus 10, a second sensor 610-2 to sense the opening/closing operation of the side door 12 may be mounted near the side door 12. The second sensor 610-2 may obtain a signal corresponding to the opening/closing operation of the side door 12 and deliver the signal to the processor 630.

For example, to replace the photoconductive drum 710, the opening operation of the front door 11 and a removing operation of the covering unit 13 may be performed. Based on replacing of the photoconductive drum 710, a mounting operation of the covering unit 13 and the closing operation of the front door 11 may be performed. In the image forming apparatus 10, a third sensor 610-3 to sense a detaching operation of the covering unit 13 may be mounted at a front surface of a consumable mounted near the front door 11. The third sensor 610-3 may obtain a signal corresponding to the detaching operation of the covering unit 13 and deliver the signal to the processor 630.

For example, the image forming apparatus 10 may check an opening/closing history of the front door 11 based on the signal detected by the first sensor 610-1. As a result, the image forming apparatus 10 may detect the opening/closing operation of the front door 11 and perform an authentication operation on a consumable corresponding to the front door 11, On the contrary, the image forming apparatus 10 may skip (e.g., not perform) an authentication operation on a consumable corresponding to the side door 12. That is, the image forming apparatus 10 may omit unnecessary authentication operations by performing authentication operations of a consumable related to a sensor from which the signal is detected and skipping an authentication operation of another consumable.

Furthermore, to select a case in which a detachment of a consumable is substantially performed, the image forming apparatus 10 may be controlled such that the authentication operation on the consumable corresponding to the front door 11 may be performed in a case the opening/closing operation of the front door 11 and the detaching operation of the covering unit 13 are detected.

The processor 630 may receive usage information of the consumable from each of the consumables 710, 720, 730, and 740, and may store the received usage information in a memory 620 as back-up usage information. For example, the back-up usage information may be updated at completion of an image forming job or at regular intervals in case of damage or deletion of the usage information stored in a memory of each of the consumables 710, 720, 730, and 740.

In addition, the memory 620 may store authentication information of each of the consumables 710, 720, 730, and 740. Based on performing an authentication operation of a consumable (e.g., a consumable 710, 720, 730, or 740), the processor 630 may perform the authentication operation on the consumable based on a result of comparing the authentication information stored in the memory of the consumable with the authentication information stored in the memory 620.

Figure 2:
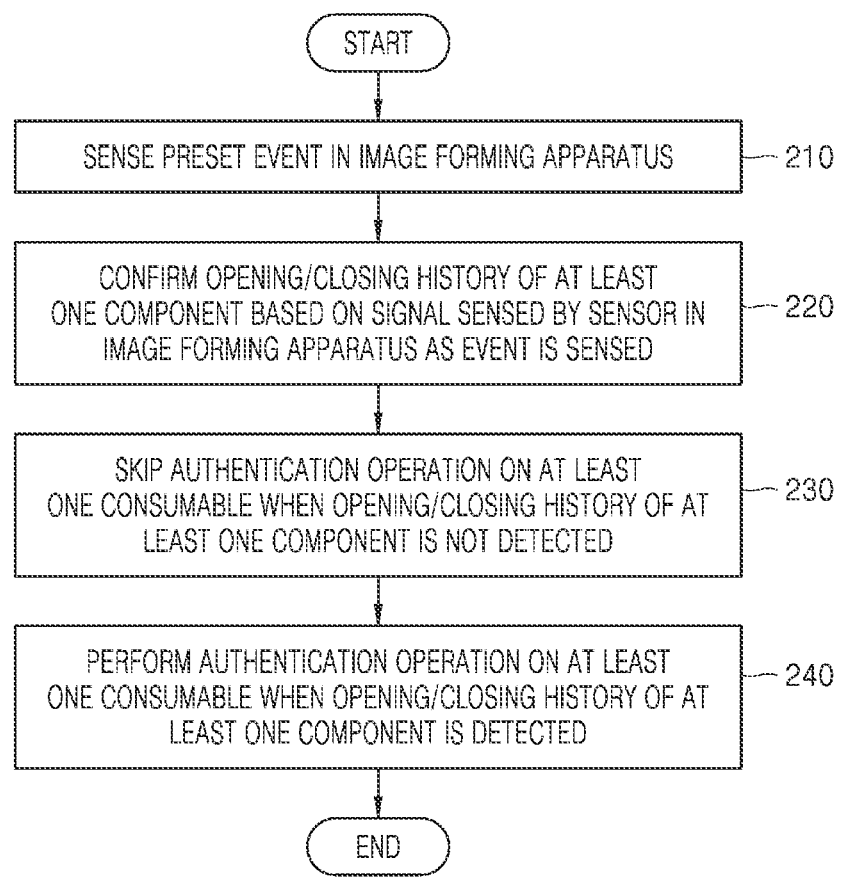
FIG. 2 is a flowchart showing an operating method of controlling an authentication operation on a consumable based on a result of confirming an opening/closing operation of a component to access the consumable in an image forming apparatus according to an example.

FIG. 2 is a flowchart showing an operating method of controlling an authentication operation on a consumable based on a result of confirming an opening/closing operation of a component to approach the consumable in an image forming apparatus according to an example.

Referring to FIG. 2, the image forming apparatus 10 may detect a preset event in the image forming apparatus 10 in operation 210. For example, the preset event may include an event of opening/closing a door mounted on the image forming apparatus 10, an event of receiving a request of an image forming job in a power-saving mode of the image forming apparatus 10, and the like. For example, in the power-saving mode, power for certain components (e.g., components other than a main board and the memory of the image forming apparatus) may be turned off. In addition, the power-saving mode may have the same meaning as the sleep mode.

In operation 220, as the event is sensed, the image forming apparatus 10 may confirm an opening/closing history of a component based on a signal sensed by a sensor in the image forming apparatus 10.

For example, in a case where the event is an event of opening/closing a door mounted on the image forming apparatus 10, the image forming apparatus 10 may begin a warm-up operation, and may confirm whether there was an opening/closing operation of the component, based on the signal sensed by the sensor.

For example, in a case where the event is an event of receiving a request for an image forming job in the power-saving mode of the image forming apparatus 10, the image forming apparatus 10 may apply power to a consumable, and may confirm, based on the signal sensed by the sensor, whether there was the opening/closing operation of the component in the power-saving mode.

For example, the image forming apparatus 10 may confirm, based on the signal detected by the sensor, whether there is a history of sensing an opening/closing operation of a door used to replace or status check the consumable. In a case where the history of sensing the opening/closing operation of the door is detected, according to operation of the image forming apparatus, the image forming apparatus 10 may perform an authentication operation on the consumable.

For example, based on the signal sensed by the sensor, the image forming apparatus 10 may confirm whether there is a history of detecting an operation of releasing (e.g., unlocking) the locking unit to detach the consumable, an operation of detaching a unit related to the consumable, or an operation in which an open time period of a door used to replace or status check the consumable exceeds a preset time period. In a case where the history of sensing the operation is detected, the image forming apparatus 10 may perform an authentication operation on the consumable in operation 240.

For example, the locking unit may have a physical structure such that the consumable may be combined with or separated from a structure of the image forming apparatus 10. For example, a unit related to the consumable may be a covering unit that is to be removed for detaching of the consumable.

For example, the image forming apparatus 10 may store the opening/closing operation of a component corresponding to a consumable for each consumable in the image forming apparatus 10. For example, the consumable mounted near the front door may be mapped with an operation of the opening/closing operation of the front door and the detaching operation of the covering unit and may be stored. For example, the consumable mounted near the front door may be a photoconductive drum, a toner cartridge, or the like. For example, the consumable mounted near the side door may be mapped with the opening/closing operation of the side door and may be stored.

The image forming apparatus 10 may confirm a component with an opening/closing history by a sensor that sensed a signal among the plurality of signals.

In operation 230, in a case where the opening/closing history of the component is not detected, the image forming apparatus may skip the authentication operation on the consumable.

For example, in a case where the opening/closing operation of the front door and the removing operation of the covering unit are detected, it may be set that an opening/closing operation of a component related to a consumable corresponding to the front door or a component of the consumable occurred. In this case, although the opening/closing operation of the front door is detected by the sensor, as long as the removing operation of the covering unit is not detected, the image forming apparatus 10 may skip performance of the authentication operation on the consumable corresponding to the front door.

For example, in a case where the opening/closing operation of the side door and the locking release operation of a locking unit of a consumable corresponding to the side door are detected, it may be set that an opening/closing operation of the component related to the consumable corresponding to the side door or the component of the consumable occurred. In this case, although the opening/closing operation of the side door is detected by the sensor, as long as the locking release operation of the locking unit is not detected, the image forming apparatus 10 may skip performance of the authentication operation on the consumable corresponding to the side door.

In operation 240, in a case where the opening/closing history of the component is detected, the image forming apparatus 10 may perform an authentication operation on the consumable.

For example, in a case where an opening/closing operation of the front door is detected, it may be set that an opening/closing operation of the component related to the consumable corresponding to the front door or the component of the consumable occurred. In the case where the opening/closing of the front door is detected by the sensor, the image forming apparatus 10 may perform an authentication operation on the consumable corresponding to the front door.

For example, in a case where the opening/closing operation of the side door is detected, it may be set that the opening/closing operation of the component related to the consumable corresponding to the side door or the component of the consumable occurred. In the case where the opening/closing operation of the side door is detected by the sensor, the image forming apparatus may perform an authentication operation on the consumable corresponding to the side door.

For example, a sensor may be mounted on each of the doors of the image forming apparatus 10. For example, the sensor may include a first sensor to sense the opening/closing operation of the front door of the image forming apparatus 10, a second sensor to sense the opening/closing operation of the side door of the image forming apparatus 10, and a third sensor to sense separation or an opening/closing operation of the covering unit that covers the front surface of the consumable.

For example, the consumable corresponding to the front door may be a consumable mounted near the front door, a photoconductive drum, a toner cartridge, and the like. For example, the consumable corresponding to the side door may be a consumable mounted near the side door, a fixing unit, an intermediate transfer belt, and the like. For example, the covering unit may cover a front surface of a consumable.

For example, in a case where a first signal is sensed by the first sensor among a plurality of sensors, the first signal may be a signal indicating the opening/closing operation of the front door. In this case, the image forming apparatus 10 may perform the authentication operation on the consumable corresponding to the front door and skip the authentication operation on the consumable corresponding to the side door.

For example, a user interface unit of the image forming apparatus 10 may receive a locking release instruction of a consumable. Based on performing an operation corresponding to the locking release instruction in the image forming apparatus 10, the image forming apparatus 10 may perform the authentication operation on the consumable.

Figure 3:
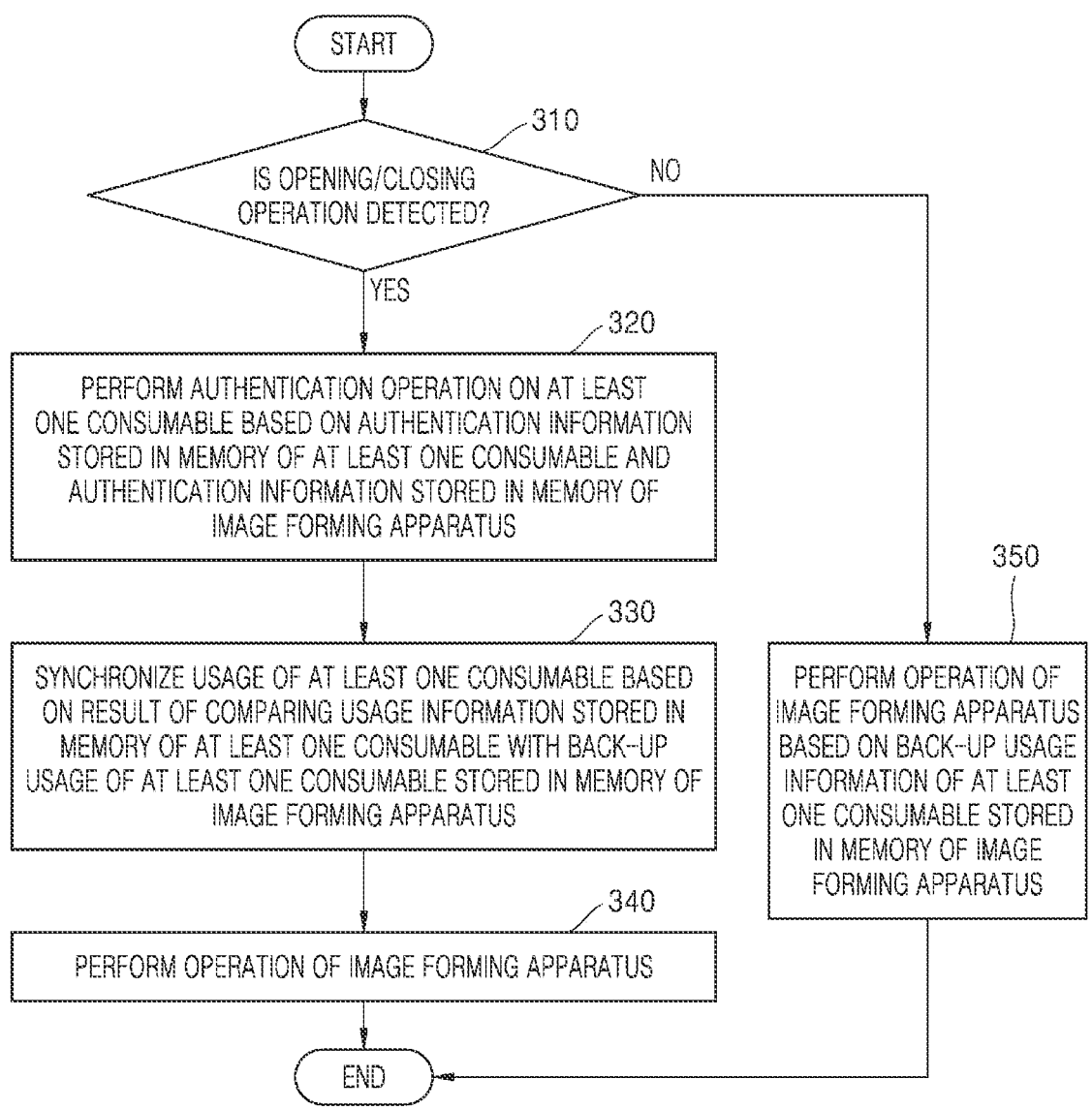
FIG. 3 is a flowchart showing an operating method of an image forming apparatus according to whether an opening/closing operation of a component to access a consumable is detected in the image forming apparatus according to an example.

FIG. 3 is a flowchart showing an operating method of an image forming apparatus according to whether an opening/closing operation of a component to approach a consumable is detected in the image forming apparatus according to an example.

Referring to FIG. 3, the image forming apparatus 10 may confirm, based on a signal sensed by a sensor of the image forming apparatus, an opening/closing history of an element to approach the consumable in operation 310. That is, the image forming apparatus 10 may detect the opening/closing operation by checking the opening/closing history.

In a case where the opening/closing operation of the component is detected, the image forming apparatus 10 may perform the authentication operation on the consumable, based on authentication information stored in a memory of the consumable and authentication information stored in a memory of the image forming apparatus 10 in operation 320.

For example, the image forming apparatus 10 may obtain intrinsic information of the consumable from the memory of the consumable. For example, the intrinsic information may include information regarding a product number of the consumable, information regarding whether the consumable is a genuine product, and the like. The image forming apparatus 10 may compare the intrinsic information obtained from the consumable with the intrinsic information of the consumable stored in the memory of the image forming apparatus 10.

As a result of the comparison, in a case where the intrinsic information obtained from the consumable and the intrinsic information stored in the image forming apparatus 10 are consistent, the image forming apparatus 10 may confirm that the consumable is not replaced and complete the authentication operation on the consumable. On the contrary, in a case where the intrinsic information obtained from the consumable and the intrinsic information stored in the image forming apparatus 10 are inconsistent, the image forming apparatus may confirm that the consumable is replaced.

Based on completing the authentication operation on the consumable, the image forming apparatus 10 may synchronize a usage of the consumable, based on a result of comparing usage information stored in the memory of the consumable with back-up usage of the consumable stored in the memory of the image forming apparatus 10 in operation 330.

For example, the image forming apparatus 10 may obtain usage information of the consumable from the memory of the consumable. The image forming apparatus 10 may compare the usage information of the consumable with the back-up usage information of the consumable stored in the image forming apparatus 10, and may perform a synchronization operation such that the usage information and the back-up usage information are consistent. For example, in a case where the usage information and the back-up usage information are inconsistent, the image forming apparatus 10 may correct the back-up usage information such that the back-up usage information and the usage information are consistent.

Based on the usage information and the back-up usage information synchronizing, the image forming apparatus 10 may perform a preparation operation of the image forming apparatus or an image forming job in operation 340.

In a case where the opening/closing operation of the component is not detected in operation 310, the image forming apparatus 10 may perform an operation of the image forming apparatus 10 based on the back-up usage information of the consumable stored in the memory of the image forming apparatus 10 in operation 350. For example, the image forming apparatus 10 may not require the usage information of the consumable from the memory of the consumable, and consider the back-up usage information of the consumable, which is stored in the memory of the image forming apparatus 10, as actual usage information and perform the operations of the image forming apparatus 10.

FIGS. 4A through 4E are drawings for describing an opening/closing operation of a consumable according to an example.

Figure 4A:
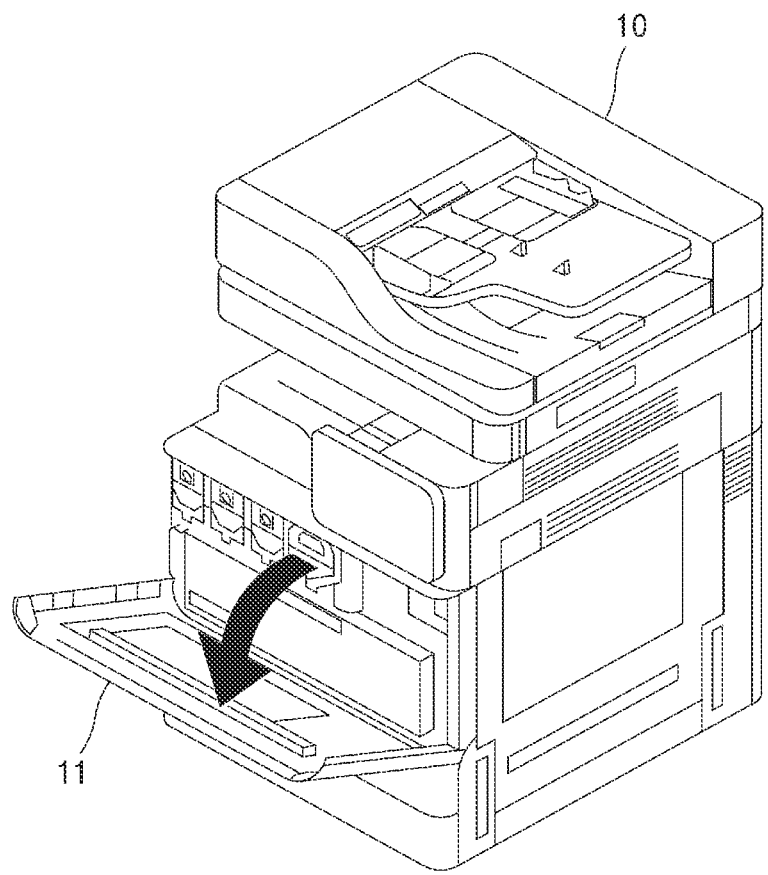
FIGS. 4A through 4E are drawings for describing an opening/closing operation of a consumable according to an example.

FIG. 4A is a diagram of an example in which the front door 11 of the image forming apparatus 10 is open. A first sensor to sense the opening/closing operation of the front door 11 may be mounted in the image forming apparatus 10. The first sensor may sense the first signal corresponding to an opening operation and a closing operation of the front door 11. Based on sensing the first signal, the image forming apparatus 10 may detect that there is the opening/closing operation of the front door 11.

For example, the image forming apparatus 10 may map and store the opening/closing operation of the front door and the detaching operation of the consumable mounted near the front door 11. Based on detecting the opening/closing operation of the front door 11 from the first signal that is obtained from the first sensor, the image forming apparatus 10 may predict that there was the detaching operation of the consumable mounted near the front door 11 and perform the authentication operation on the consumable. For example, the consumable mounted near the front door 11 may be a photoconductive drum or a toner cartridge.

Figure 4B:
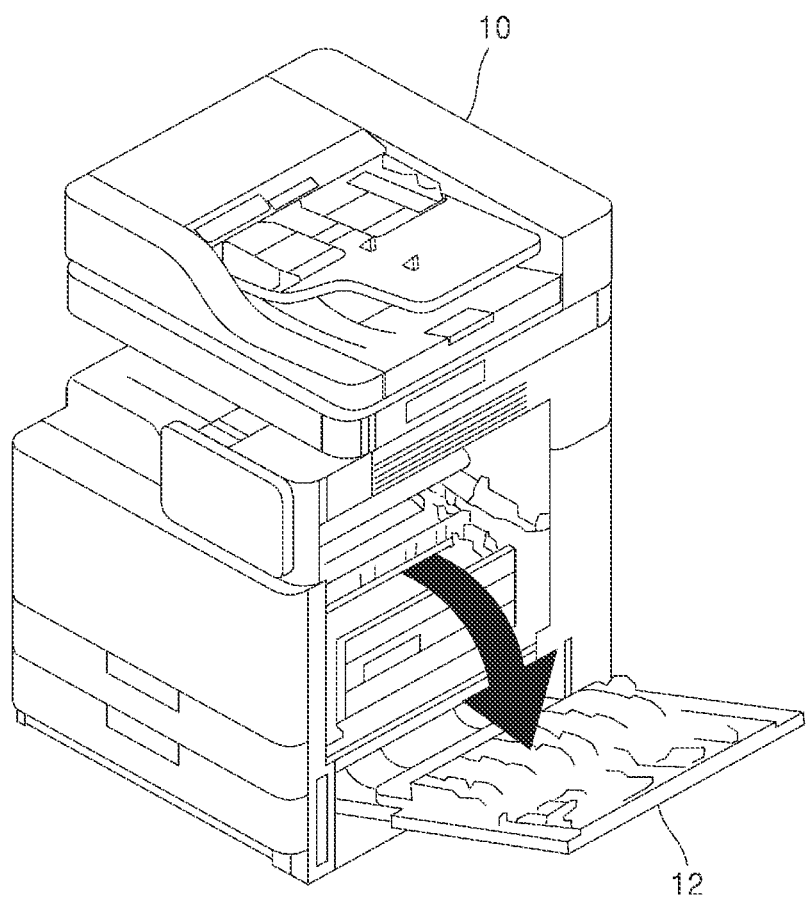

FIG. 4B is a diagram of an example in which the side door 12 of the image forming apparatus 10 is open. A second sensor to sense the opening/closing operation of the side door 12 may be mounted in the image forming apparatus 10. The second sensor may sense a second signal corresponding to an opening operation and a closing operation of the side door 12. Based on sensing the second signal, the image forming apparatus 10 may detect that there is the opening/closing operation of the side door 12.

For example, the image forming apparatus 10 may map and store the opening/closing operation of the side door 12 and the detaching operation of the consumable mounted near the side door 12. Based on detecting the opening/closing operation of the side door 12 from the second signal that is obtained from the second sensor, the image forming apparatus 10 may predict that there was the opening/closing operation of the consumable mounted near the side door 12 and perform the authentication operation on the consumable. For example, the consumable mounted near the side door 12 may be a fixing unit or an intermediate transfer belt.

Figure 4C:
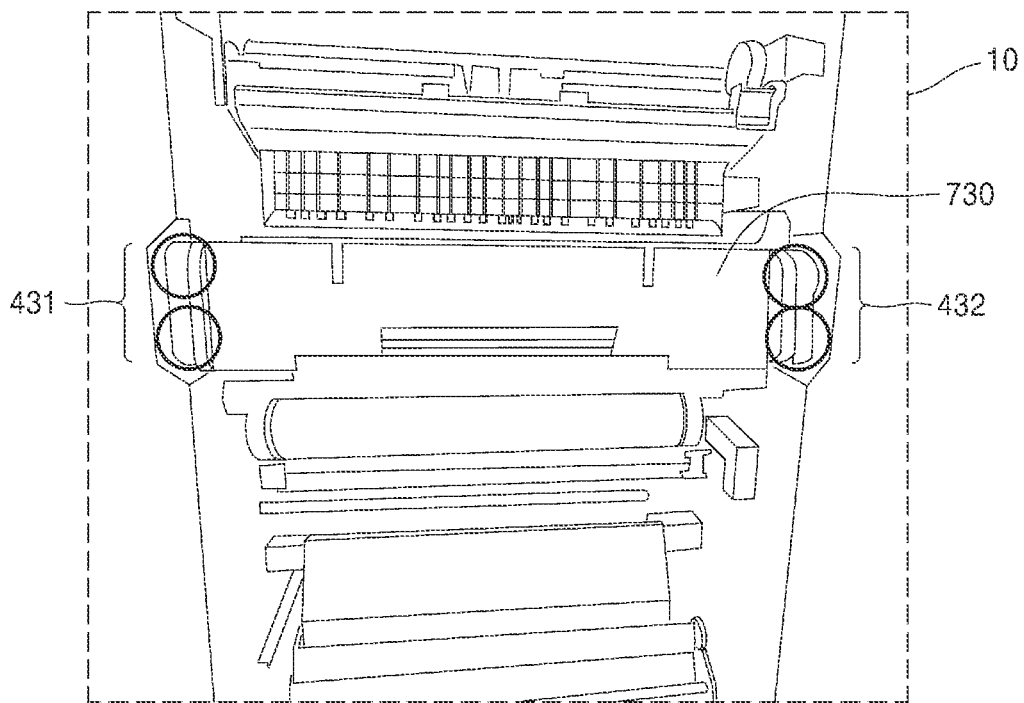

FIG. 4C is a diagram for describing a process in which a fixing unit 730 is removed in a state where the side door 12 of the image forming apparatus is open. The fixing unit 730 may be mounted near the side door 12 of the image forming apparatus 10. For example, the fixing unit 730 may be removed to replace or check the fixing unit 730. For example, as shown in FIG. 4C, the fixing unit 730 may be removed by using locking units 431 and 432 at two ends of the fixing unit 730. For example, the fixing unit 730 may be removed by pressing and pulling the locking units 431 and 432, or may be removed by other methods. In this case, a third sensor to sense a locking release (e.g., unlocking) operation of the locking units 431 and 432 may be mounted in the image forming apparatus 10. The third sensor may sense a third signal corresponding to the locking release operation and a locking operation of the locking units 431 and 432. Based on sensing the third signal, the image forming apparatus 10 may detect that there was the detaching operation of the fixing unit 730.

For example, the image forming apparatus 10 may map and store the locking release operation of the locking units 431 and 432 and the detaching operation of the fixing unit 730. Based on detecting the locking release operation of the locking units 431 and 432 from the third signal that is obtained from the third sensor, the image forming apparatus 10 may predict that there was the detaching operation of the fixing unit 730 and perform the authentication operation on the fixing unit 730.

Although a case in which the third sensor senses the locking release operation of the locking units 431 and 432 is described with reference to FIG. 4O, a sensor to sense a locking release operation of a locking unit of a consumable other than the fixing unit 730 may be mounted in the image forming apparatus 10.

Figure 4D:
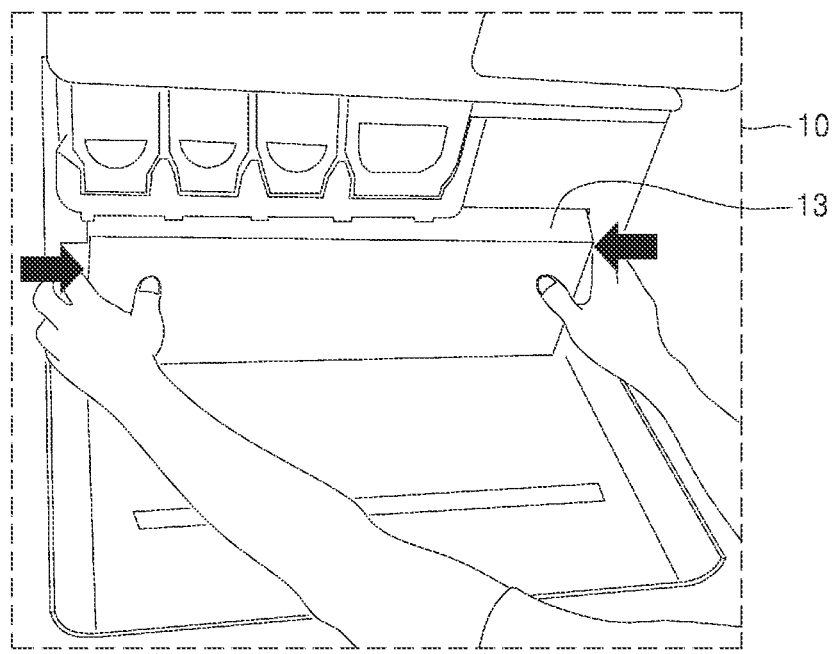

FIG. 4D is a diagram for describing a process in which the covering unit 13 is removed in a state where the front door 11 of the image forming apparatus 10 is open. For example, the covering unit 13 may be a unit covering a front surface of a consumable, such as a waste toner container, a duct, and the like. For example, the consumable may be a consumable mounted near the front door 11.

A fourth sensor to sense the detaching operation of the covering unit 13 may be mounted in the image forming apparatus 10. The fourth sensor may sense a fourth signal corresponding to a removing operation and a detaching operation of the covering unit 13. Based on sensing the fourth signal, the image forming apparatus 10 may detect that there was a detaching operation of the covering unit 13.

For example, the image forming apparatus 10 may map and store the detaching operation of the covering unit 13 and the detaching operation of the consumable that is open by the front surface as the covering unit 13 is removed. Based on detecting the detaching operation of the covering unit 13 from the fourth signal that is obtained from the fourth sensor, the image forming apparatus 10 may predict that there was the detaching operation of the consumable that is open by the front surface as the covering unit 13 is removed, and may perform the authentication operation on the consumable. For example, the consumable may be a photoconductive drum, a toner cartridge, and the like.

Figure 4E:
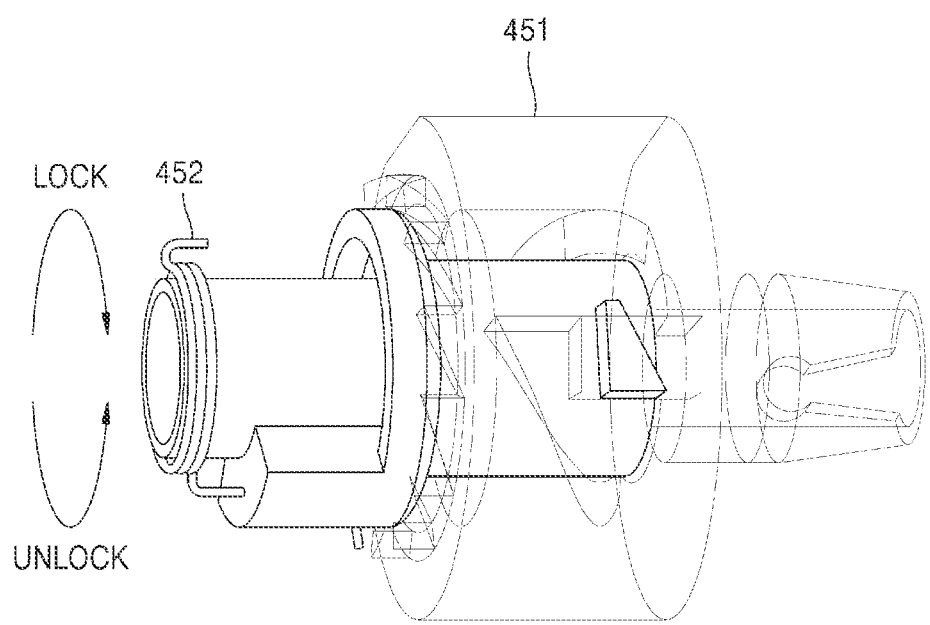

FIG. 4E is a diagram for describing a locking release (e.g., unlocking) operation and a locking operation of locking units 451 and 452 that may be mounted in a toner cartridge. As shown in FIG. 4E, based on turning a first locking unit 452 in a first direction, as the first locking unit 452 is separated from a second locking unit 451, the toner cartridge may be removed. The operation of turning the first locking unit 452 in the first direction may indicate the locking release operation of the locking units 451 and 452. On the contrary, based on turning the first locking unit 452 in a second direction, as the first locking unit 452 is combined with the second locking unit 451, the toner cartridge may be mounted. The operation of turning the first locking unit 452 in the second direction may indicate the locking operation of the locking units 451 and 452.

A fifth sensor to sense the locking release operation and the locking operation of the locking units 451 and 452 may be mounted in the image forming apparatus 10. The fifth sensor may sense a fifth signal corresponding to the locking release operation and the locking operation of the locking units 451 and 452. Based on sensing the fifth signal, the image forming apparatus 10 may detect that there was the detaching operation of the toner cartridge.

For example, the image forming apparatus 10 may map and store the locking release operation and the locking operation of the locking units 451 and 452 and the detaching operation of the toner cartridge. Based on detecting the locking release operation of the locking units 451 and 452 from the fifth signal that is obtained from the fifth sensor, the image forming apparatus 10 may predict that there was the detaching operation of the toner cartridge and perform the authentication operation on the toner cartridge.

Although an example case in which the fifth sensor senses the locking release operation of the locking units 451 and 452 of the toner cartridge is described with reference to FIG. 4E, a sensor to sense a locking release operation of a locking unit of a consumable other than the toner cartridge may be mounted in the image forming apparatus 10.

In addition, although a case of detecting that there were the locking release operation and the locking operation by using the signal sensed by the sensor was described with reference to FIG. 4E, it may also be detected that there were the locking release operation and the locking operation of the locking units 451 and 452 according to a rotation time period of a motor in the locking units 451 and 452. For example, in a case where the motor of the locking units 451 and 452 is driven as a step motor, based on a rotation time period of the motor that is driven after the locking release instruction satisfying a preset reference time period, the image forming apparatus 10 may detect that there was the locking release operation of the locking units 451 and 452. For example, the preset reference time period may be detected according to operation characteristics of the motor.

Figure 5:
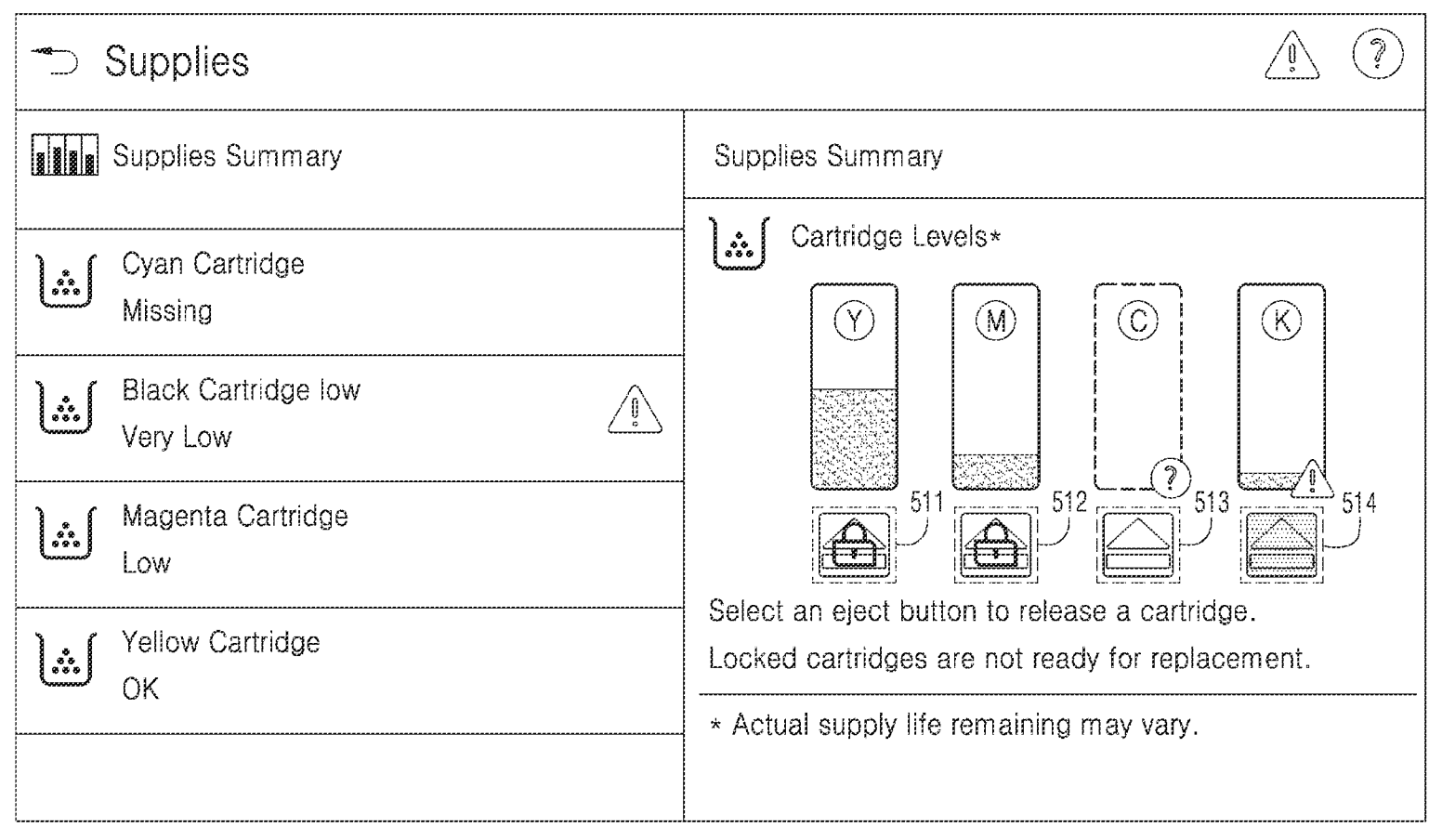

FIG. 5 is a diagram for describing a screen displayed in a user interface unit of an image forming apparatus according to an example.

Referring to FIG. 5, a user interface unit of the image forming apparatus 10 may display information regarding a cartridge mounted in the image forming apparatus 10. For example, the user interface unit may display information regarding an amount of toner of each color remaining in a toner cartridge.

For example, in a case where the amount of toner remaining in the toner cartridge is sufficient, the user interface unit may display an indicator "OK", and may display marks 511 and 512 indicating a locked state on a button that controls the removing operation of the toner cartridge.

For example, in a case where the amount of toner remaining in the toner cartridge is insufficient, the user interface unit may display an indicator "Very Low", and may display a mark 514 indicating a locking release state on a button that controls the removing operation of the toner cartridge, Based on receiving an input to select the mark 514 indicating the locking release state, the image forming apparatus 10 may control the locking units of the toner cartridge in a state where the toner cartridge may be removed.

For example, in a case where the toner cartridge is not mounted in the image forming apparatus 10, the user interface unit may display a mark 513 indicating a state where the toner cartridge is not mounted in the image forming apparatus 10.

For example, the user interface unit of the image forming apparatus may receive a locking release instruction of a consumable in the image forming apparatus. Based on removing the consumable in response to the locking release instruction, the image forming apparatus 10 may perform an authentication operation on the consumable.

Figure 6:
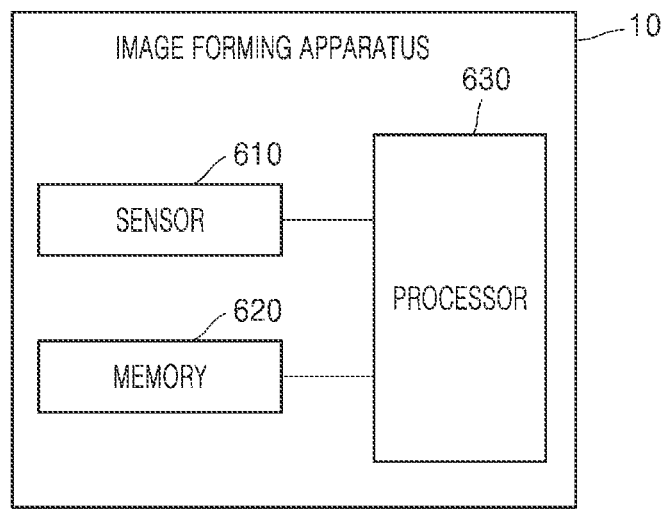
FIG. 6 is a block diagram of an image forming apparatus according to an example.

FIG. 6 is a block diagram of an image forming apparatus according to an example.

Referring to FIG. 6, the image forming apparatus 10 may include the sensor 610, the memory 620, and the processor 630. The image forming apparatus 10 may include more elements than shown in the drawing, and may also include fewer elements than shown in the drawing. Hereinafter, examples of the elements will be described.

The sensor 610 may sense an operation corresponding to the locking release of an element in the image forming apparatus 10. For example, a plurality of sensors 610 may respectively be attached to each door of the image forming apparatus 10. For example, the sensor 610 may include the first sensor to sense the opening/closing operation of the front door of the image forming apparatus 10, the second sensor to sense the opening/closing operation of the side door of the image forming apparatus, the third sensor to sense the separation operation or the opening/closing operation of the covering unit that covers the front surface of the consumable, and the fourth sensor to sense the locking operation or the locking release operation of the locking units of the consumable.

The memory 620 may store machine readable instructions or a program. For example, the memory 620 may store a program related to an operation of the image forming apparatus 10.

The processor 630 may execute a program stored in the memory 620, read data or a file stored in the memory 620, or store a new file in the memory 620. The processor 630 may execute instructions stored in the memory 620.

The processor 630 may sense a preset event in the image forming apparatus 10. For example, the preset event may include an event of opening/closing a door mounted in the image forming apparatus 10, an event of receiving a request for an image forming job in a power-saving mode of the image forming apparatus 10, and the like.

As the event is sensed, the processor 630 may confirm, based on the signal detected by the sensor 610 in the image forming apparatus 10, the opening/closing history of an element to approach a consumable.

For example, in a case where the event is an event of opening/closing a door mounted on the image forming apparatus 10, the processor 630 may begin a warm-up operation, and may confirm, based on the signal sensed by the sensor 610, whether there was an opening/closing operation of the element.

For example, in a case where the event is an event of receiving a request for the image forming job in the power-saving mode of the image forming apparatus 10, the processor 630 may apply power to the consumable, and may confirm, based on the signal sensed by the sensor 610, whether there was the opening/closing operation of the element in a state of the power-saving mode.

For example, the processor 630 may confirm, based on the signal sensed by the sensor 610, whether there is a history of sensing an opening/closing operation of a door used to replace or state check the consumable. In a case where the history of sensing the opening/closing operation of the door is detected, the processor 630 may perform an authentication operation on the consumable.

For example, based on the signal sensed by the sensor 610, the processor 630 may confirm whether there is a history of detecting an operation of releasing locking of the locking unit to detach the consumable, an operation of detaching a unit related to the consumable, or an operation in which an open time period of a door used to replace or status check the consumable exceeds a preset time period. In a case where the history of detecting the operation is detected, the processor 630 may perform the authentication operation on the consumable.

For example, a locking unit may have a physical structure such that the consumable may be combined with or separated from a structure of the image forming apparatus 10. For example, a unit related to the consumable may be a covering unit that is to be removed in advance for detaching of the consumable.

For example, the processor 630 may store an opening/closing operation of a component corresponding to a consumable for each consumable in the image forming apparatus 10. For example, the locking release operation of the consumable mounted near the front door may be mapped with an operation of the opening/closing operation of the front door and the detaching operation of the covering unit and may be stored. For example, the consumable mounted near the front door may be a photoconductive drum, a toner cartridge, or the like. For example, the consumable mounted near the side door may be mapped with the opening/closing operation of the side door and may be stored.

The processor 630 may check the component with the opening/closing history by a sensor, by which a signal is detected, among the plurality of sensors.

In a case where the opening/closing history of the component is not detected, the processor 630 may skip the authentication operation on the consumable.

For example, in a case where the opening/closing operation of the front door and the removing operation of the covering unit are detected, it may be set that an opening/closing operation of a component related to a consumable corresponding to the front door or a component of the consumable occurred. In this case, although the opening/closing operation is detected by the sensor 610, as long as the removing operation of the covering unit is not detected, the processor 630 may skip performance of the authentication operation on the consumable corresponding to the front door.

For example, in a case where the opening/closing operation of the side door and the locking release operation of a locking unit of a consumable corresponding to the side door are detected, it may be set that an opening/closing operation of the component related to the consumable corresponding to the side door or the component of the consumable occurred. In this case, although the opening/closing operation of the side door is detected by the sensor 610, as long as the locking release operation of the locking unit is not detected, the processor 630 may skip the authentication operation on the consumable corresponding to the side door.

In a case where an opening/closing history of a component is detected, the processor 630 may perform an authentication operation on a consumable.

For example, in a case where the opening closing operation of the front door is detected, it may be set that an opening/closing operation of the component related to the consumable corresponding to the front door or the component of the consumable occurred. In the case where the opening/closing operation of the front door is detected by the sensor 610, the processor 630 may perform an authentication operation on the consumable corresponding to the front door.

For example, in a case where the opening/closing operation of the side door is detected, it may be set that the opening/closing operation of the component related to the consumable corresponding to the side door or the component of the consumable occurred. In the case where the opening/closing operation of the side door is detected by the sensor 610, the processor 630 may perform the authentication operation on the consumable corresponding to the side door.

For example, in a case where the first signal is sensed by the first sensor among the plurality of sensors, the first signal may be a signal indicating the opening/closing operation of the front door. In this case, the processor 630 may perform the authentication operation on the consumable corresponding to the front door and skip the authentication operation on the consumable corresponding to the side door.

For example, a user interface unit of the image forming apparatus 10 may receive a locking release instruction of a consumable. Based on performing an operation corresponding to the locking release instruction in the image forming apparatus 10, the image forming apparatus 10 may perform the authentication operation on the consumable.

Figure 7:
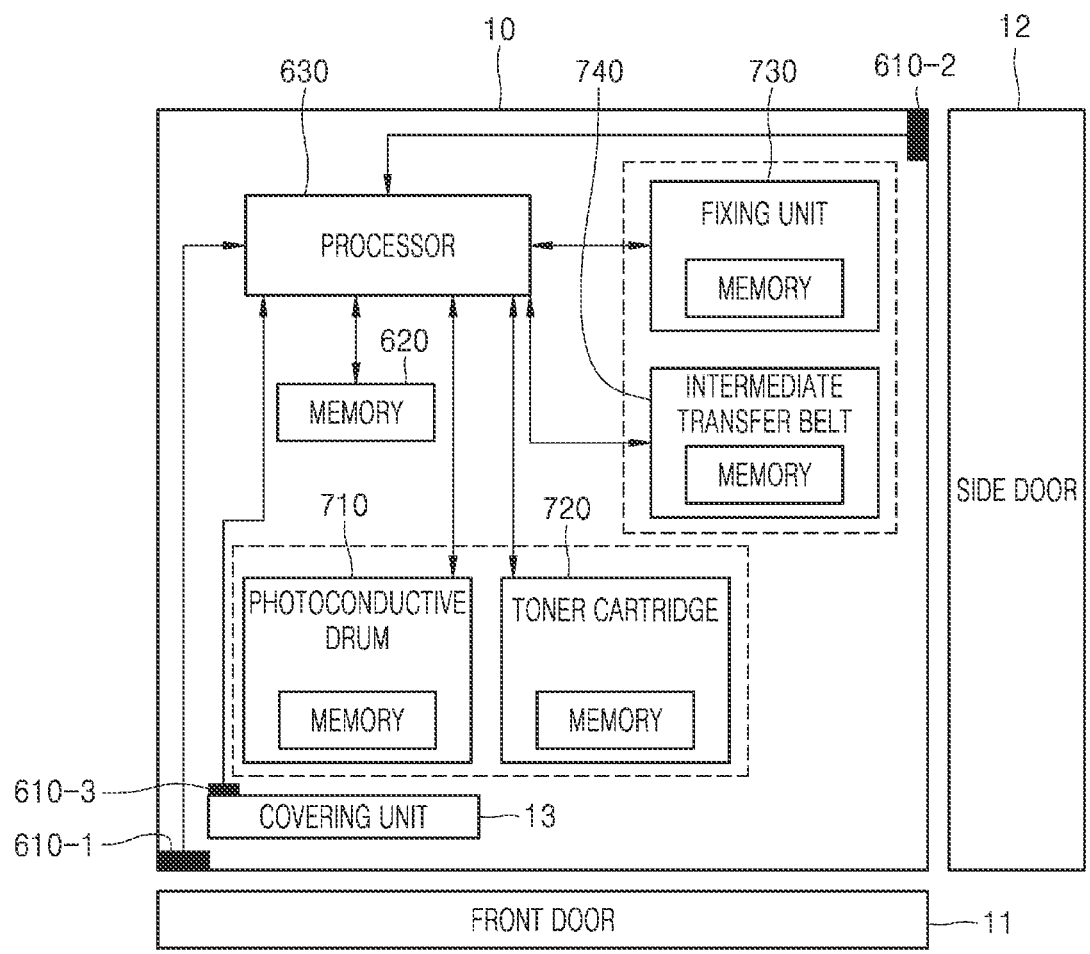
FIG. 7 is a block diagram of an image forming apparatus according to an example.

FIG. 7 is a block diagram of an image forming apparatus according to an example.

Referring to FIG. 7, the image forming apparatus 10 may include sensors 610-1, 610-2, and 610-3, the memory 620, the processor 630, the front door 11, the side door 12, the covering unit 13, the photoconductive drum 710, the toner cartridge 710, the fixing unit 730, and the intermediate transfer belt 740. The image forming apparatus 10 may include more elements than shown in the drawing, and the image forming apparatus 10 may also include fewer elements than shown in the drawing. Hereinafter, descriptions with reference to FIGS. 1 through 6 are omitted.

The processor 630 may confirm an opening/closing history of a component based on a signal detected by a sensor of the image forming apparatus 10. The image forming apparatus 10 may detect the opening/closing operation by confirming the opening/closing history.

For example, the image forming apparatus may confirm, based on a signal detected by a second sensor 610-2, an opening/closing history of a component related to a consumable corresponding to the side door 12. As a result of the confirming, the processor 630 may detect the opening/closing operation of the component related to the consumable corresponding to the side door 12, and may perform the authentication operation on the consumable corresponding to the side door 12. The consumable corresponding to the side door 12 may include the fixing unit 730 and the intermediate transfer belt 740.

For example, the processor 630 may perform authentication operations on the fixing unit 730 and the intermediate transfer belt 740 based on authentication information respectively stored in memories of the fixing unit 730 and the intermediate transfer belt 740 and authentication information stored in the memory 620 of the image forming apparatus 10.

For example, the processor 630 may obtain intrinsic information of a consumable from the memories of the fixing unit 730 and the intermediate transfer belt 740. For example, the intrinsic information may include information regarding a product number of the consumable, information regarding whether the consumable is a genuine product, and the like. The processor 630 may compare the intrinsic information, which is obtained from the fixing unit 730 and the intermediate transfer belt 740, with the intrinsic information of the consumable stored in the memory 620 of the image forming apparatus 10.

As a result of the comparison, in a case where the intrinsic information obtained from the fixing unit 730 and the intermediate transfer belt 740 and the intrinsic information stored in the image forming apparatus 10 are consistent, the processor 630 may confirm that the consumable was not replaced, and complete the authentication operations on the fixing unit 730 and the intermediate transfer belt 740. On the contrary, in a case where the intrinsic information obtained from the fixing unit 730 and the intermediate transfer belt 740 and the intrinsic information stored in the image forming apparatus 10 are inconsistent, the processor 630 may confirm that the consumable was replaced.

Based on completing the authentication operations on the fixing unit 730 and the intermediate transfer belt 740, the processor 630 may synchronize usage of the fixing unit 730 and the intermediate transfer belt 740, based on the usage information stored in the memories of the fixing unit 730 and the intermediate transfer belt 740 with the back-up usage information of the fixing unit 730 and the intermediate transfer belt 740 stored in the memory 620 of the image forming apparatus 10.

For example, the processor 630 may obtain usage information of a consumable from the memories of the fixing unit 730 and the intermediate transfer belt 740. The processor 630 may compare the usage information of the fixing unit 730 and the intermediate transfer belt 740 with the back-up usage information of the fixing unit 730 and the intermediate transfer belt 740 stored in the image forming apparatus 10, and may perform a synchronization operation such that the usage information and the back-up usage information are consistent. For example, in a case where the usage information and the back-up usage information are inconsistent, the processor 630 may correct the back-up usage information such that the back-up usage information is consistent to the usage information.

Based on synchronizing the usage information and the back-up usage information, the processor 630 may perform a preparation operation of the image forming job or the image forming job.

In a case where the opening/closing operation of the component is not detected, the processor 630 may perform the operations of the image forming apparatus 10 based on the back-up usage information of the consumable stored in the memory 620 of the image forming apparatus. For example, the processor 630 may not require the usage information of the consumable to the memory of the consumable, and may perform the operations of the image forming apparatus considering the back-up information of the consumable, which is stored in the memory 620 of the image forming apparatus 10, as the actual usage information.

Figure 8:
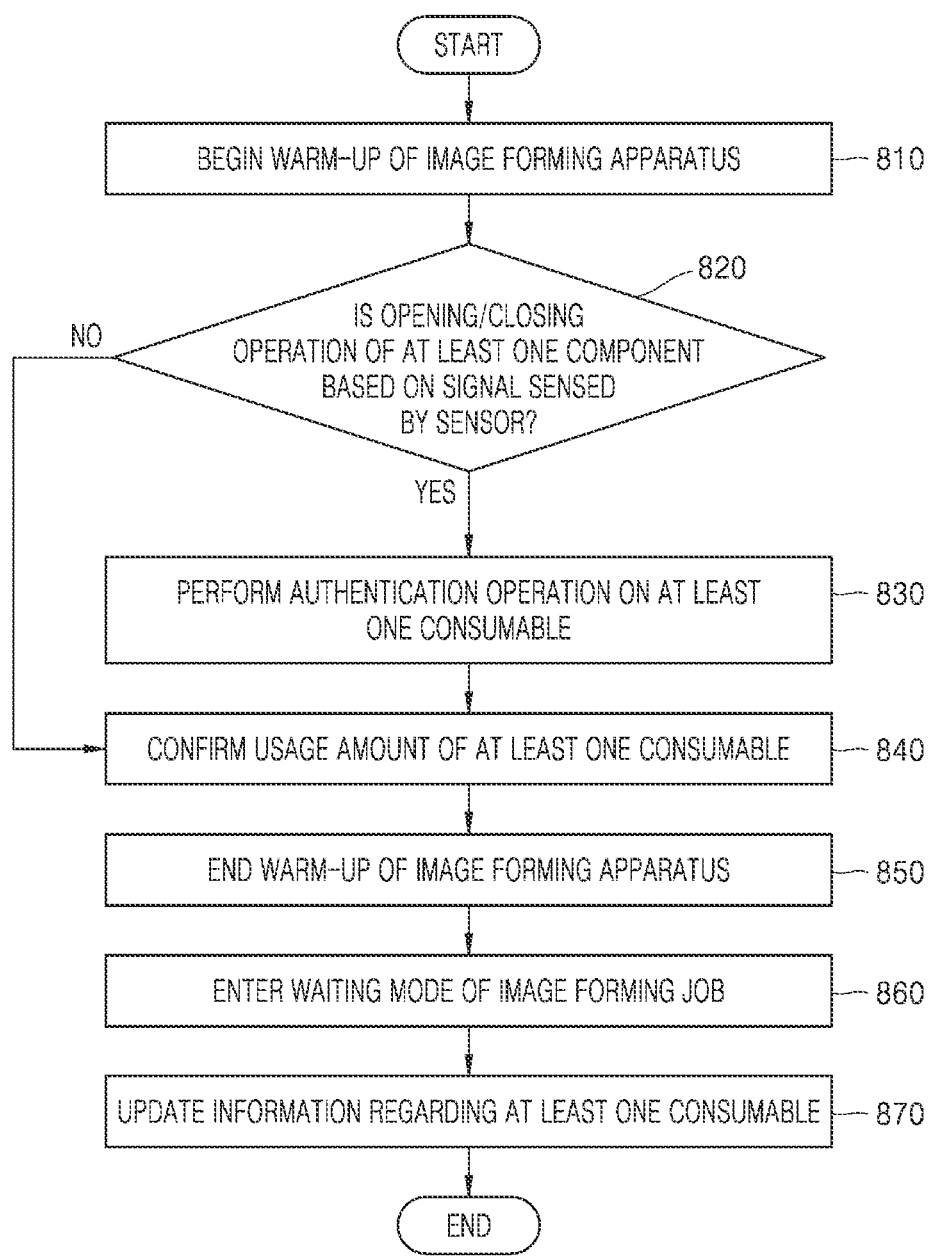
FIG. 8 is a flowchart for describing a warming-up operating method of an image forming apparatus according to an example.

FIG. 8 is a flowchart for describing a warm-up operating method of the image forming apparatus.

Referring to FIG. 8, the image forming apparatus 10 may begin warm-up of the image forming apparatus 10 as a preset event is sensed in operation 810. For example, the preset event may be an event of opening or closing a door mounted on the image forming apparatus 10. The image forming apparatus 10 may detect whether the event to open or close the door occurred from a signal detected by a sensor mounted on the image forming apparatus 10.

In operation 820, the image forming apparatus 10 may confirm, based on the signal sensed by the sensor, whether an opening/closing operation of a consumable to approach the consumable is detected.

In a case where the opening/closing operation of the component is detected, the image forming apparatus 10 may perform an authentication operation on the consumable in operation 830. For example, the image forming apparatus 10 may perform the authentication operation on the consumable based on a result of comparing the authentication information, which is stored in a memory of the consumable, with the authentication information stored in the memory of the image forming apparatus 10. For example, the authentication information may include information regarding a product number of the consumable, information regarding whether the consumable is a genuine product, and the like.

Based on completing the authentication operation on the consumable, the image forming apparatus 10 may confirm the usage of the consumable in operation 840. For example, the image forming apparatus 10 may synchronize the usage of the consumable based on a result of comparing the usage information, which is stored in the memory of the consumable, with the back-up usage information of the consumable stored in the memory of the image forming apparatus 10.

In a case where the opening/closing operation of the component is not detected in operation 820, the image forming apparatus 10 may confirm the usage of the consumable based on the back-up usage information of the consumable stored in the memory of the image forming apparatus 10 in operation 840. For example, the image forming apparatus 10 may not acquire the usage information of the consumable from the memory of the consumable, and may consider the back-up usage information of the consumable, which is stored in the memory of the image forming apparatus 10, as the actual usage information.

In operation 850, the image forming apparatus 10 may complete the warm-up of the image forming apparatus 10 by confirming the state of the consumable based on a result of confirming the usage of the consumable.

In operation 860, the image forming apparatus 10 may enter a waiting mode of the image forming job. For example, in a case where a request for a print job is received by the image forming apparatus 10, the image forming apparatus 10 may enter the waiting mode for the print job.

In operation 870, based on completing an operation in the image forming apparatus 10, the image forming apparatus 10 may update information of the consumable. For example, the image forming apparatus 10 may transmit an update request of the usage information of the consumable to the memory of the consumable. In addition, the image forming apparatus 10 may update the back-up usage information stored in the memory of the image forming apparatus 10.

Figure 9:
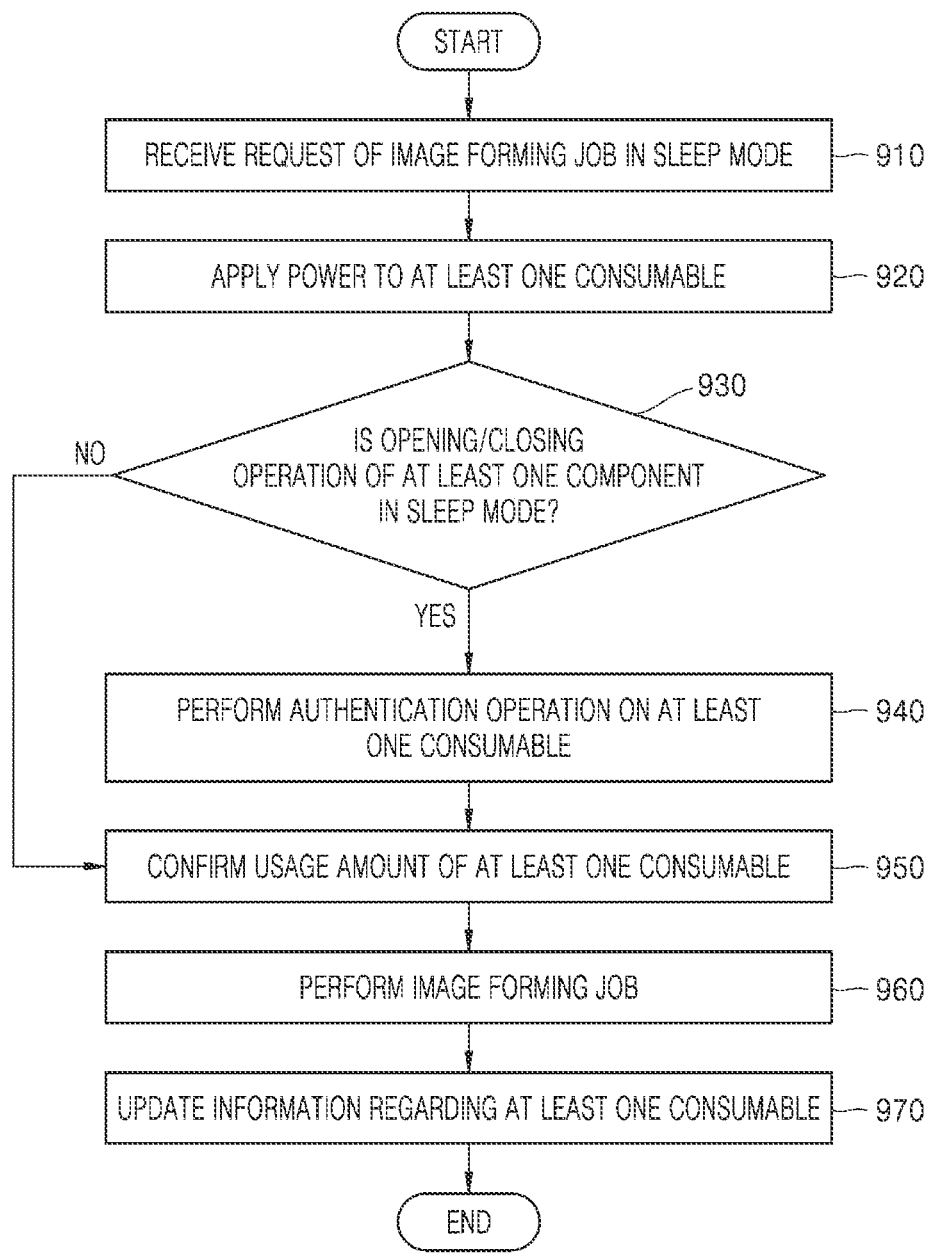
FIG. 9 is a flowchart for describing an operating method of an image forming apparatus according to receipt of a request for an image forming job in a sleep mode according to an example.

FIG. 9 is a flowchart for describing an operating method of an image forming apparatus according to receipt of a request for an image forming job in a sleep mode according to an example.

Referring to FIG. 9, the image forming apparatus 10 may receive a request for an image forming job in the sleep mode in operation 910. In operation 920, the image forming apparatus 10 may apply power to the consumable.

In operation 930, the image forming apparatus 10 may confirm, based on the signal sensed by the sensor, whether the opening/closing operation of the component is detected in the sleep mode.

In a case where the opening/closing operation of the component is detected, the image forming apparatus 10 may perform the authentication operation on the consumable in operation 940.

Based on completing the authentication operation on the consumable, the image forming apparatus 10 may confirm the usage amount of the consumable in operation 950. For example, the image forming apparatus 10 may synchronize the usage of the consumable based on a result of comparing the usage information, which is stored in the memory of the consumable, with the back-up usage information of the consumable stored in the memory of the image forming apparatus 10, and may check the usage of the consumable based on a result of the synchronization.

In a case where the opening/closing operation of the component is not detected in operation 930, the image forming apparatus 10 may check the usage amount of the consumable based on the back-up usage information of the consumable stored in the memory of the image forming apparatus 10 in operation 950.

In operation 960, the image forming apparatus 10 may perform the image forming job. In operation 970, based on completing the image forming job, the image forming apparatus 10 may update information regarding the consumable.

In addition, in a case where the opening/closing operation of the component is not detected, the image forming apparatus 10 may perform the image forming job based on the usage of the consumable stored in the memory of the image forming apparatus 10. After that, the image forming apparatus 10 may perform the authentication operation on the consumable and update the information regarding the consumable.

Figure 10:
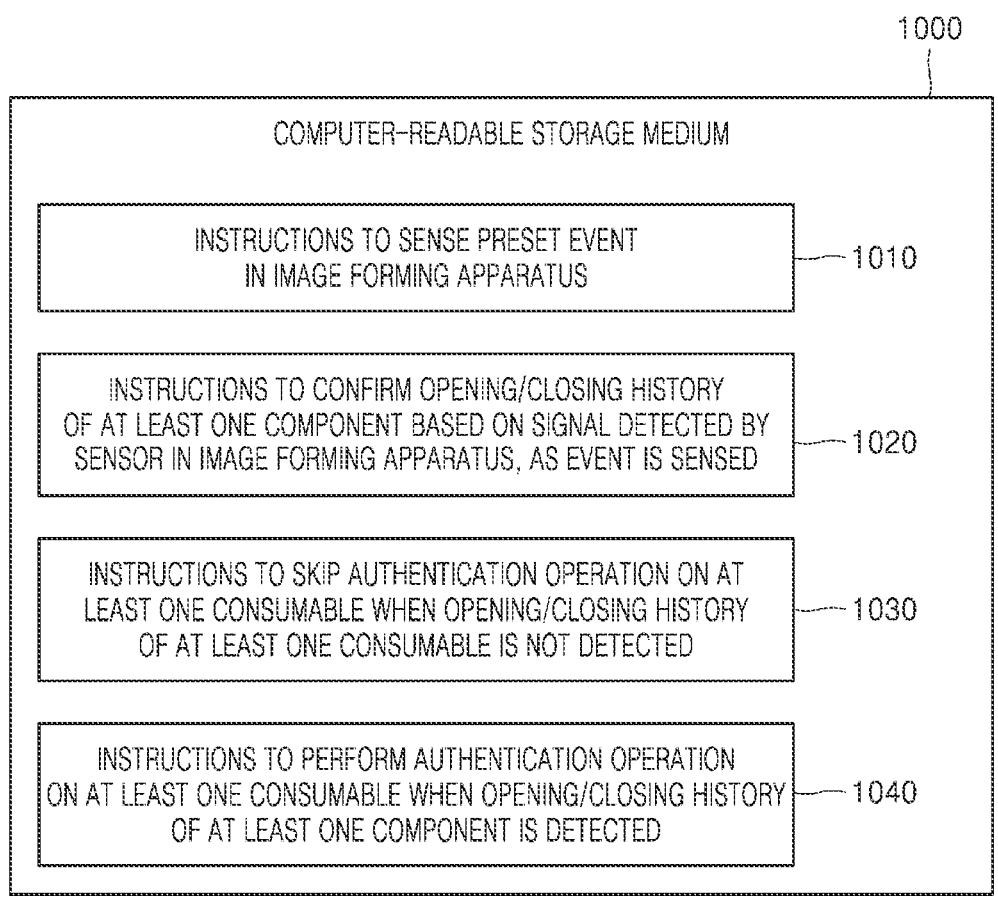
FIG. 10 is a diagram for describing instructions stored in a computer-readable storage medium according to an example.

FIG. 10 is a diagram for describing instructions stored in a computer-readable storage medium according to an example.

The computer-readable storage medium 1000 shown in FIG. 10 may store instructions regarding an example operating method of an image forming apparatus for controlling an authentication operation on a consumable according to detection of an operation corresponding to a locking release of the consumable. For example, the computer-readable storage medium 1000 may store instructions 1010 to sense a preset event in the image forming apparatus, instructions 1020 to confirm an opening/closing history of a component to approach a consumable based on a signal sensed by a sensor in the image forming apparatus as the preset event is sensed, instructions 1030 to perform an operation of skipping the authentication operation on the consumable in a case where the opening/closing history of the component is not detected, and instructions 1040 to perform the authentication operation on the consumable in a case where the opening/closing history of the component is detected.

The example operating methods of the image forming apparatus 10 may be implemented as a non-transitory computer-readable storage medium storing instructions or data that may be executed by using a computer or a processor. The method may be written as a program that is executable in a computer, and may be implemented in a general-purpose digital computer that operates such a program by using a computer-readable storage medium. Such a computer-readable storage medium may include read-only memory (ROM), random-access memory (RAM), flash memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, a magnetic tape, a floppy disc, a magneto-optical data storage medium, an optical data storage medium, a hard disc, a solid-state disc (SSD), and any device capable of storing machine readable instructions, relevant data, data files, and data structures and providing machine readable instructions, relevant data, data files, and data structures to the processor or computer such that the processor or computer may execute the instructions.

It should be understood that examples described herein should be considered in a descriptive sense and not for purposes of limitation. Descriptions of features or aspects within each example should typically be considered as available for other similar features or aspects in other examples. While examples have been described with reference to the figures, it will be understood that various changes in form and details may be made therein without departing from the spirit and scope as defined by the following claims.

What is claimed is:

1. An image forming apparatus comprising:
 a sensor to sense an opening or a closing of a component to access a consumable in the image forming apparatus;
 a processor; and
 a memory to store instructions executable by the processor,
 wherein the processor, by executing the instructions, is to:
  confirm an opening/closing history of the component based on a signal sensed by the sensor, as a preset event occurs in the image forming apparatus, and
  skip performance of an authentication operation on the consumable in a case where the opening/closing history of the component is not detected for a time period prior to the preset event.

2. The image forming apparatus of claim 1, wherein the processor, by executing the instructions, is to perform the authentication operation on the consumable in a case where the opening/closing history of the component is detected.

3. The image forming apparatus of claim 1, wherein the preset event comprises an event of opening or closing a door mounted on the image forming apparatus or an event of receiving a request for an image forming job in a power-saving mode of the image forming apparatus.

4. The image forming apparatus of claim 1, wherein, in a case where the component includes a door to access the consumable, the processor, by executing the instructions, is to:
confirm whether there is a history of sensing the opening or the closing of the door based on a signal sensed by the sensor, and
perform the authentication operation on the memory of the consumable in a case where the history of sensing the opening or the closing of the door is detected.

5. The image forming apparatus of claim 1, wherein the processor, by executing the instructions, is to:
confirm, based on the signal sensed by the sensor, whether there is a history of detecting an operation of releasing locking of a locking unit to detach the consumable, an operation of detaching a unit related to the consumable, or an operation in which an open time of a door used to replace or status check the consumable exceeds a preset time, and
perform the authentication operation on the consumable in a case where a history of sensing the operation is detected.

6. The image forming apparatus of claim 1, wherein the processor, by executing the instructions, is to perform the authentication operation on a consumable corresponding to a first door and skip performance of the authentication operation on consumables corresponding to a plurality of doors other than the first door in a case where the signal sensed by the sensor indicates a signal corresponding to an opening/closing operation of the first door among the plurality of doors mounted on the image forming apparatus.

7. The image forming apparatus of claim 1, wherein, in a case where the event includes an event of receiving a request for an image forming job in a power-saving mode of the image forming apparatus, the processor, by executing the instructions, is to apply power to the consumable and confirm, based on the signal sensed by the sensor, whether there was an opening or a closing operation of the component in the power-saving mode.

8. The image forming apparatus of claim 1, wherein the processor, by executing the instructions, is to:
perform the authentication operation on the consumable based on authentication information stored in a memory of the consumable and authentication information stored in the memory in a case where the opening/closing history of the component is detected, and
in a case where the authentication operation is complete, synchronize usage of the consumable based on a result of comparing usage information stored in a memory of the consumable with back-up usage information of the consumable stored in the memory.

9. The image forming apparatus of claim 8, wherein the processor, by executing the instructions, is to, in a case where the opening/closing history of the component is not detected, skip performance of the authentication operation on the consumable and confirm usage of the consumable based on the back-up usage information of the consumable stored in the memory.

10. The image forming apparatus of claim 1, further comprising a user interface unit, wherein the processor, by executing the instructions, is to:
receive a locking release command of the consumable through the user interface unit, and
perform the authentication operation on the consumable in a case where an operation corresponding to the locking release command is performed.

11. The image forming apparatus of claim 1, wherein the processor, by executing the instructions, is to, in a case where an image forming job in the image forming apparatus is complete, update usage information of the consumable, stored in the memory of the consumable, and back-up usage information of the consumable, stored in the memory.

12. The image forming apparatus of claim 1, wherein the sensor comprises:
a first sensor to sense an opening/closing operation of a front door of the image forming apparatus;
a second sensor to sense an opening/closing operation of a side door of the image forming apparatus; or
a third sensor to sense a separation or the opening/closing operation of a covering unit covering a front surface of the consumable.

13. The image forming apparatus of claim 1, wherein the component is a door or covering unit.

14. The image forming apparatus of claim 1, wherein the processor, by executing the instructions, is to perform the authentication operation on a consumable corresponding to a first door and skip performance of the authentication operation on consumables corresponding to doors other than the first door in a case where the signal sensed by the sensor indicates an opening/closing operation of the first door.

15. The image forming apparatus of claim 1, wherein the sensor comprises:
a first sensor to sense an opening/closing operation of a front door of the image forming apparatus; and
a second sensor to sense an opening/closing operation of a second door of the image forming apparatus.

16. The image forming apparatus of claim 1, wherein the preset event includes receiving a request for an image forming job in a power-saving mode of the image forming apparatus.

17. An operation method of an image forming apparatus, the operation method comprising:
sensing a preset event in the image forming apparatus;
confirming, as the preset event is sensed, an opening/closing history of a component to access a consumable in the image forming apparatus, based on a signal sensed by a sensor in the image forming apparatus;
skipping performance of an authentication operation on the consumable in a case where the opening/closing history of the component is not detected for a time period prior to a preset event; and
performing the authentication operation on the consumable in a case where the opening/closing history of the component is detected for the time period prior to the preset event.

18. The operation method of claim 17, wherein the confirming of the opening/closing history of the component based on the signal sensed by the sensor comprises confirming, based on the signal sensed by the sensor, whether there is a history of detecting an operation of opening or closing a door to replace or status check the consumable, an operation of releasing locking of a locking unit to detach the consumable, an operation of detaching a unit related to the consumable, or an operation in which an open time of the door exceeds a preset time period.

19. A non-transitory computer-readable storage medium comprising:
instructions to sense a preset event in an image forming apparatus;
instructions to confirm, as the event is sensed, an opening/closing history of a component to access a consumable in the image forming apparatus, based on a signal sensed by a sensor in the image forming apparatus;

instructions to skip performance of an authentication operation on the consumable in a case where the opening/closing history of the component is not detected for a time period prior to the preset event; and instructions to perform the authentication operation on the consumable in a case where the opening/closing history of the component is detected for the time period prior to the preset event.

* * * * *